(12) United States Patent
Julka et al.

(10) Patent No.: US 7,209,741 B2
(45) Date of Patent: Apr. 24, 2007

(54) METHOD OF ACQUIRING A MOBILE STATION IDENTIFIER IN A HYBRID NETWORK

(75) Inventors: Vibhor Julka, San Diego, CA (US); Erik Colban, San Diego, CA (US)

(73) Assignee: Telefonaktiebolaget LM Ericsson (publ) (SE)

( * ) Notice: Subject to any disclaimer, the term of this patent is extended or adjusted under 35 U.S.C. 154(b) by 150 days.

(21) Appl. No.: 11/027,666

(22) Filed: Dec. 31, 2004

(65) Prior Publication Data

US 2006/0039310 A1    Feb. 23, 2006

Related U.S. Application Data

(60) Provisional application No. 60/603,694, filed on Aug. 23, 2004.

(51) Int. Cl.
H04Q 7/20 (2006.01)
H04Q 7/38 (2006.01)

(52) U.S. Cl. .............. 455/435.1; 455/435.2; 455/445; 455/414.1; 455/414.2; 455/466; 455/426.1; 455/422.1; 370/310; 370/352; 370/353; 370/355; 370/356; 370/342; 370/343

(58) Field of Classification Search ............ 370/310, 370/328, 329, 342, 343, 349, 351, 352, 353, 370/355, 356; 455/414.1, 414.2, 414.3, 552.1, 455/553.1, 551, 412.1, 412.2, 414.4, 435.1, 455/435.2, 426.1, 426.2, 422.1, 403, 436–445, 455/550.1, 500, 517

See application file for complete search history.

(56) References Cited

U.S. PATENT DOCUMENTS

| | | |
|---|---|---|
| 6,480,717 B1 | 11/2002 | Ramaswamy |
| 2002/0057658 A1 | 5/2002 | Lim |
| 2002/0068570 A1 | 6/2002 | Nischal et al. |
| 2003/0104813 A1 | 6/2003 | Vibhor et al. |
| 2004/0114553 A1* | 6/2004 | Jiang et al. .................. 370/328 |
| 2004/0120283 A1* | 6/2004 | Rezaiifar et al. ........... 370/328 |

FOREIGN PATENT DOCUMENTS

| | | |
|---|---|---|
| EP | 1318684 | 6/2003 |
| EP | 1424810 | 6/2004 |
| WO | WO 01/80591 | 10/2001 |
| WO | WO 0186883 | * 11/2001 |
| WO | WO 03/090433 | 10/2003 |

OTHER PUBLICATIONS

3GPP2: "Interoperability Specification (ISO) for High Rate Packet Data (HRPD) Access Network Interfaces," 3GPP2 A. S0008-0 V3.0, 'Online! May 2003, XP002352199.

3GPP2: "cdma2000 High Rate Packet Data Air Interface Specification," 3GPP2 C. S0024-A V1.0, Chapter 5, "3G1X Circuit Services Notification Application", Online! Mar. 31, 2004, pp. 5-1-5-38, XP002352200.

* cited by examiner

Primary Examiner—Keith Ferguson
(74) Attorney, Agent, or Firm—Coats & Bennett, PLLC

(57) ABSTRACT

An access network obtains a non-native mobile station identifier, such as an International Mobile Station Identifier, for use in establishing a packet data call by inducing the mobile station to transmit a non-native message containing the mobile station identifier encapsulated in a native message. The access network de-capsulates and parses the non-native message to obtain the mobile station identifier.

14 Claims, 3 Drawing Sheets

METHOD OF ACQUIRING A MOBILE STATION IDENTIFIER IN A HYBRID NETWORK

RELATED APPLICATIONS

This application claims priority to Provisional U.S. patent application Ser. No. 60/603,694 filed Aug. 23, 2004, which is incorporated herein by reference.

BACKGROUND OF THE INVENTION

The present invention relates generally to the operation of mobile stations in a hybrid wireless communication network, and more particularly, to a method of obtaining a mobile station identifier from a mobile station in a network where the mobile station identifier is not native to the air interface.

Cellular networks were originally developed to provide primarily voice services over circuit-switched networks. The introduction of packet switched 2.5 G and 3 G networks enables network operators to provide data services as well as voice services. Eventually, network architecture is expected to evolve toward all-IP networks providing both voice and data services. However, network operators have a substantial investment in existing infrastructure and would therefore prefer to migrate gradually to an all-IP network architecture to allow them to use their existing infrastructure. At the same time, network operators recognize that there is a demand for high rate packet-data services. In order to provide high-rate packet data services, network operators may deploy hybrid networks wherein a high data rate (HDR) network is overlaid on an existing circuit-switched or packet-switched network as a first step in the transition to an all IP-based network.

One example of a hybrid network combines a cdma2000 1× (IS2000) network and an HRPD (IS856-A) network. A mobile station operating in a hybrid network supports both the IS2000 and IS856-A air interfaces. Both the cdma2000 1× and HRPD networks can support packet data services. To provide seamless packet data services, it is desirable that a mobile station be able to continue a packet data session when it transitions between the HRPD and cdma2000 1× networks. Under current standards, the mobile station is assigned a static mobile station identifier, such as an International Mobile Station Identifier (IMSI). The IMSI is used to select a packet data serving node (PDSN) to connect the mobile station to a packet core network (PCN). The IMSI is also used as a mobile station identifier on the interface to the PCN (i.e., the A9/A11 interface), and by the PDSN to identify the packet data session.

All mobile terminals that are capable of supporting the cdma2000 air interface are assigned a unique IMSI. In cdma2000 1× networks, the IMSI is included in air interface messages transmitted to and from the mobile station. Thus, a cdma2000 1× base station can determine the IMSI of a mobile station by monitoring messages transmitted over the air interface. In contrast, air interface messages in the HRPD network do not contain the IMSI. Instead, the HRPD network assigns a temporary and typically geographically specific Unicast Access Terminal Identifier (UATI) to the mobile station that is included in air interface messages. The method of assigning a UATI is not standardized and thus the methods used vary from one network operator to another. During the course of a HRPD session, the UATI can be changed, for example, in response to a mobility event such as a handoff. Thus, the HRPD network cannot obtain the IMSI by monitoring messages transmitted over the air interface.

The interoperability standards (TIA-878 and TIA-1878) for HRPD networks contain procedures that allow the HRPD network to obtain the IMSI of a mobile station. During session establishment, the HRPD AN (TIA-878) or a Session Controller/Mobility Manager (SC/MM) in the HRPD network (TIA-1878) may acquire the IMSI of the mobile station from an AAA server when authenticating the mobile station. This procedure requires the network operator to provision the IMSI at the AAA server. This procedure is not available if the HRPD AN or SC/MM does not support the A12 interface.

If the HRPD AN or SC/MM is unable to obtain the IMSI of a mobile station from an AAA server, the HRPD AN or SC/MM may generate and assign a random IMSI to the mobile station to use for signaling with the PDSN. The random IMSI is not transmitted to the mobile station over the air interface and the mobile station has no knowledge of it. When the HRPD AN receives messages from the mobile station over the air interface, it correlates the UATI with the random IMSI and uses the random IMSI for signaling with the PDSN. If the mobile station subsequently transitions to the cdma2000 1× network, the cdma2000 1× base station will determine the IMSI of the mobile station from the signaling messages transmitted over the cdma2000 1× air interface and use this IMSI for signaling with the PDSN. In this scenario, the PDSN will not have any record of a packet data session associated with the IMSI received from the cdma2000 1× base station. Therefore, PDSN will set-up a new packet data session for the mobile station based on the IMSI received from the cdma2000 1× base station. Setting up a new packet data session requires additional signaling and control procedures, such as PPP establishment/negotiation and, in some circumstances, mobile IP registration. These procedures will cause some delay in delivering packets and possibly data loss.

A similar problem may occur when a mobile station hands off between two HRPD ANs. Normally, the IMSI used by the source AN to communicate with the PDSN is sent to the target HRPD AN over the A13 signaling interface along with other session information. When there is no A13 link between the source HRPD AN and the target HRPD AN, there is no mechanism for informing the target HRPD AN of the IMSI. Consequently, the target HRPD AN will assign a new IMSI to use for signaling with the PDSN, which is not likely to match the IMSI used by the PDSN to identify the packet data session. The PDSN will not be able to identify the existing packet data session because the target HRPD AN is using a different IMSI and therefore will set up a new packet data session for the mobile station. As previously describe, setting up a new packet data session will cause some delay and may result in packet data loss.

SUMMARY OF THE INVENTION

The present invention provides a method for acquiring a mobile station identifier from a mobile station over an air interface in which the mobile station identifier is not native. In an exemplary embodiment, the present invention is used by an HRPD access network to obtain the International Mobile Station Identifier (IMSI) from the mobile station over an HRPD (e.g., IS856-A) air interface. The HRPD air interface includes a protocol for transmitting 3G1× signaling messages to and from the mobile station over the HRPD air interface by encapsulating the 3G1× message in an HRPD message. This protocol is known as the 3G1x circuit services notification protocol and is implemented by a circuit services notification application (CSNA) in the HRPD AN. The 3G1x circuit services notification protocol enables the mobile station and HRPD AN to configure a filter that allows only certain messages to be transmitted to the mobile station.

According to the present invention, the circuit services notification application is configured to allow transmission of status request messages to the mobile station, and extended status response messages from the mobile station over the HRPD air interface. The status request and the extended status response messages are transmitted over the HRPD air interface by encapsulating them in an HRPD message. The HRPD AN can obtain an IMSI during packet data session establishment by sending a status request message to the mobile station requesting the mobile station IMSI using the circuit services notification protocol, and receiving an extended status response message in reply from the mobile station containing the mobile station IMSI. The IMSI can be determined by the HRPD AN by de-capsulating and parsing the extended status response message to extract the IMSI. The IMSI extracted from the extended status response message can be associated with the packet data session and used in signaling with a packet data service node (PDSN).

The present invention allows seamless packet data services to be provided to the mobile station when the HRPD network has no other way of obtaining the IMSI of the mobile station. The present invention may be useful in numerous situations. For example, the present invention is useful when the AAA server does not have the correct IMSI for the mobile station, or when the HRPD network does not support the A12 interface. The present invention may also be used to provide an alternative method of obtaining the mobile station identifier even when the A12 interface is supported.

DETAILED DESCRIPTION OF THE INVENTION

Figure 1:
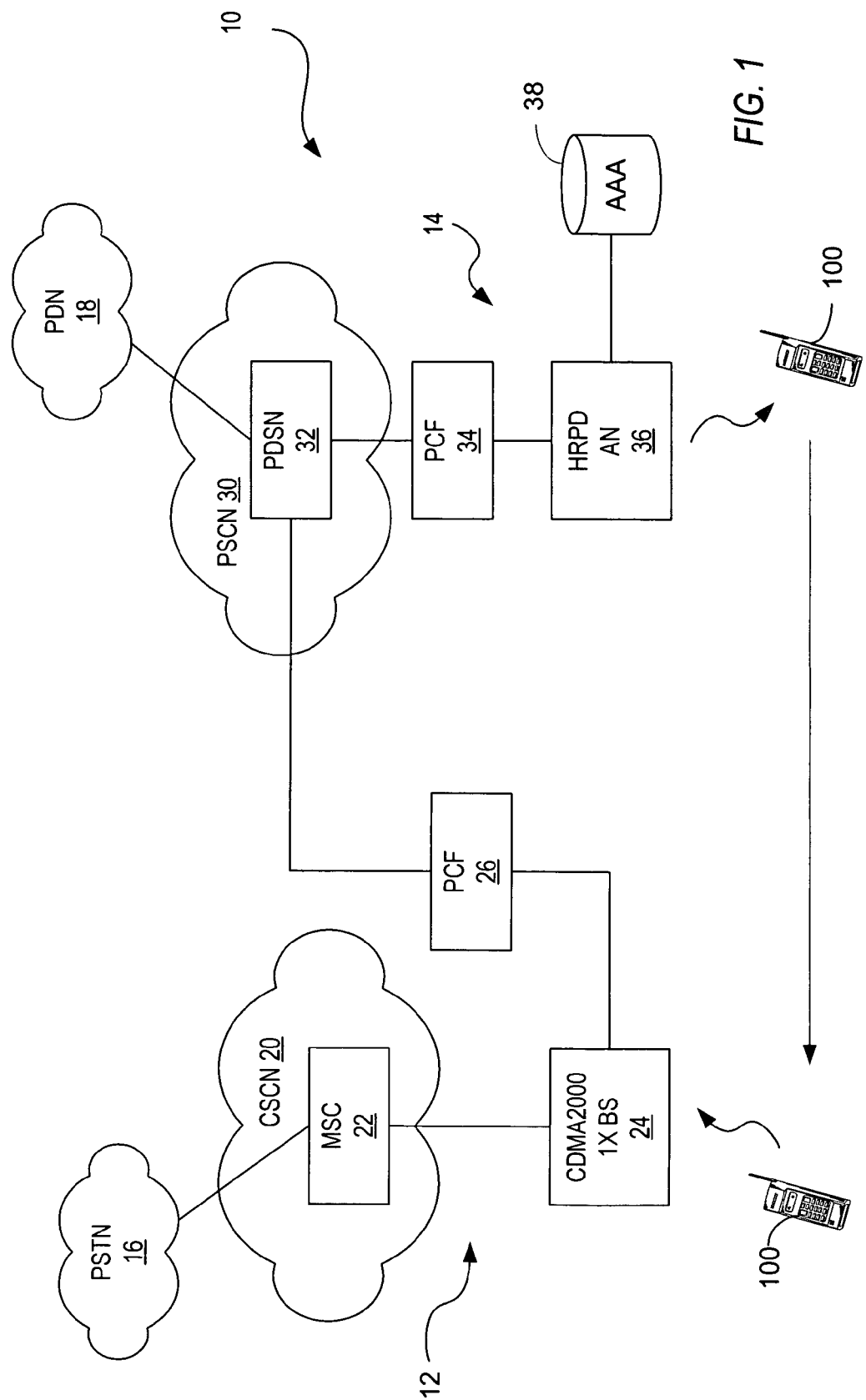
FIG. 1 is a diagram illustrating an exemplary hybrid network combining an cdma2000 1x network and an HRPD network.

Referring now to the drawings, the present invention will be described in the context of a hybrid network 10 providing both voice and data services to mobile stations 100. In the exemplary embodiment shown herein, the hybrid network 10 comprises a cdma2000 1x (IS2000) radio access network 12 and an HRPD (IS856-A) radio access network 14. The cdma2000 RAN 12 is referred to herein as the cdma2000 1x network 12. The HRPD RAN 14 is referred to herein as the HRPD network 14. The exemplary embodiment is intended to be illustrative only and those skilled in the art will appreciate that the present invention also applies to networks based on other network standards.

The cdma2000 1x network 12 comprises one or more base stations 24 connected to a circuit-switched core network (CSCN) 20. The CSCN 20 primarily provides voice services and low rate data services, such as facsimile services, to the mobile stations 100. The CSCN 20 includes a mobile switching center (MSC) 22 that provides a connection to the public-switched telephone network (PSTN) 16. The MSC 22 routes traffic between the PSTN 16 and the base stations 24. The base stations 24 communicate with the mobile stations 100 over the air interface. The base stations 24 forward downlink traffic and signaling from the MSC 22 to the mobile stations 100, and forward uplink traffic and signaling from the mobile stations 100 to the MSC 22.

The cdma2000 1x network 12 may further include a packet control function (PCF) 26 that connects the cdma2000 1x network 12 to a packet-switched core network (PSCN) 30. The PSCN 30 includes a PDSN 32 that connects to a packet data network 18, such as the Internet. The PSCN 30 enables the cdma2000 1x base stations 24 to provide packet data services to mobile stations 100. The PDSN 32 establishes communication sessions with mobile stations 100 using, for example, the point-to-point protocol (PPP). The cdma2000 1x network 12 forwards mobile-terminated packet data from the PDSN 32 to the mobile stations 100, and forwards mobile-originated packet data from the mobile stations 100 to the PDSN 32.

A high data rate (HDR) network, such as an HRPD network 14, may be combined with a cdma2000 1x network 12 to provide high speed packet data services. The IS856-A standard is generally known as 1xEV-DO. The HRPD network 14 comprises one or more HRPD access networks (ANs) 36 for communicating with the mobile stations 100 over an HRPD air interface and a packet core function (PCF) 34 connecting the HRPD network 14 to the PDSN 32. The HRPD AN 36 and PCF 34 perform essentially the same functions as the cdma2000 1x base station 24 and PCF 26.

The mobile station 100 is capable of operating over both the IS2000 air interface and HRPD air interface. When a mobile station operating in the HRPD network 14 is engaged in a packet data session, there may be circumstances where the mobile station 100 is required to transition to the cdma2000 1x network 12. For example, in a hybrid network 10 where HRPD coverage is limited, the mobile station 100 may move out of an HRPD coverage zone. In this situation, it is desirable for the mobile station 100 to transition seamlessly between the HRPD network 14 and cdma2000 1x network 12. Under current standards, when the mobile station 100 transitions to the cdma2000 1x network 12 based on detecting a packet zone change or for other reasons, it will send an origination message to the cdma2000 1x base station 24 to initiate a dormant handoff. The origination message will contain the International Mobile Station Identifier (IMSI) of the mobile station 100. Receipt of this message will trigger the cdma2000 1x base station 24 to establish a connection to the PDSN 32. The cdma2000 1x base station 24 may use the IMSI to determine which PDSN 32 to connect to, if more than one exists. The cdma2000 base station 24 will also send the IMSI of the mobile station 100 to the PDSN 32 to identify the packet data session. Once the A10 connection is established, the PDSN 32 will forward packet data traffic for the packet data session identified by the IMSI to the cdma2000 1x base station 24.

To enable the seamless transfer of the packet data session from the HRPD network 14 to the cdma2000 1x network 12, the HRPD network 14 should use the mobile station's assigned IMSI when the packet data call is setup (either initial or after a handoff from the cdma2000 network) so that both the HRPD network 14 and the cdma20001x network will be using the same IMSI. Conventionally, the HRPD AN 36 obtains the IMSI of the mobile station 100 from an AAA server 38 (FIG. 1) during packet data call setup. If the AAA server 38 does not have the IMSI for the mobile station 100, or the HRPD AN 36 does not support the A12 interface, the HRPD AN 36 may assign a random IMSI to the mobile station 100 to identify the packet data session. In this case, the random IMSI is provided to the PDSN 32 during call set up and used by the PDSN 32 to identify the packet data session. If the mobile station 100 associated with the random IMSI subsequently transitions to the cdma2000 1× network 12, the PDSN 32 will not have a record of a packet data session for the IMSI contained in the registration request received from the cdma2000 1× network 12. Thus, in this scenario, the PDSN 32 will set up a new packet data session, which will cause some delay in delivering packet data and possibly result in data loss.

The present invention provides a method for the HRPD AN 36 to obtain the IMSI from the mobile station 100 over the HRPD air interface when it cannot otherwise obtain the IMSI from an AAA server 38. The HRPD air interface includes a protocol for transmitting 3G 1x signaling messages to and from the mobile station 100 over the HRPD air interface by encapsulating the 3G 1x message in an HRPD message. This protocol is known as the 3G 1x circuit services notification protocol and is implemented by a circuit services notification application (CSNA) 42 (FIG. 3) in the HRPD AN 36. The 3G 1x circuit services notification protocol enables the mobile station 100 and HRPD AN 36 to configure a filter that allows only certain messages to be transmitted to the mobile station 100.

According to the present invention, the HRPD AN 36 induces the mobile station 100 to transmit a 3G 1x message over the HRPD air interface containing the IMSI for the mobile station 100. In one exemplary embodiment of the invention, the HRPD AN 36 configures the CSNA 42 to transmit 3G 1x status request messages to the mobile station 100, and to receive 3G 1x extended status response messages from the mobile station 100. During packet data session establishment, the HRPD AN 36 sends a status request message requesting the IMSI to the mobile station 100 using the circuit services notification protocol. The HRPD AN 36 uses the UATI of the mobile station 100 as the destination address in the status request message. The mobile station 100 sends an extended status response message containing the IMSI of the mobile station 100. The HRPD AN 36 de-capsulates and parses the extended status response message to obtain the IMSI of the mobile station 100. The IMSI obtained from the mobile station 100 over the HRPD air interface is then used to establish the packet data session with the PDSN 32.

Figure 2:
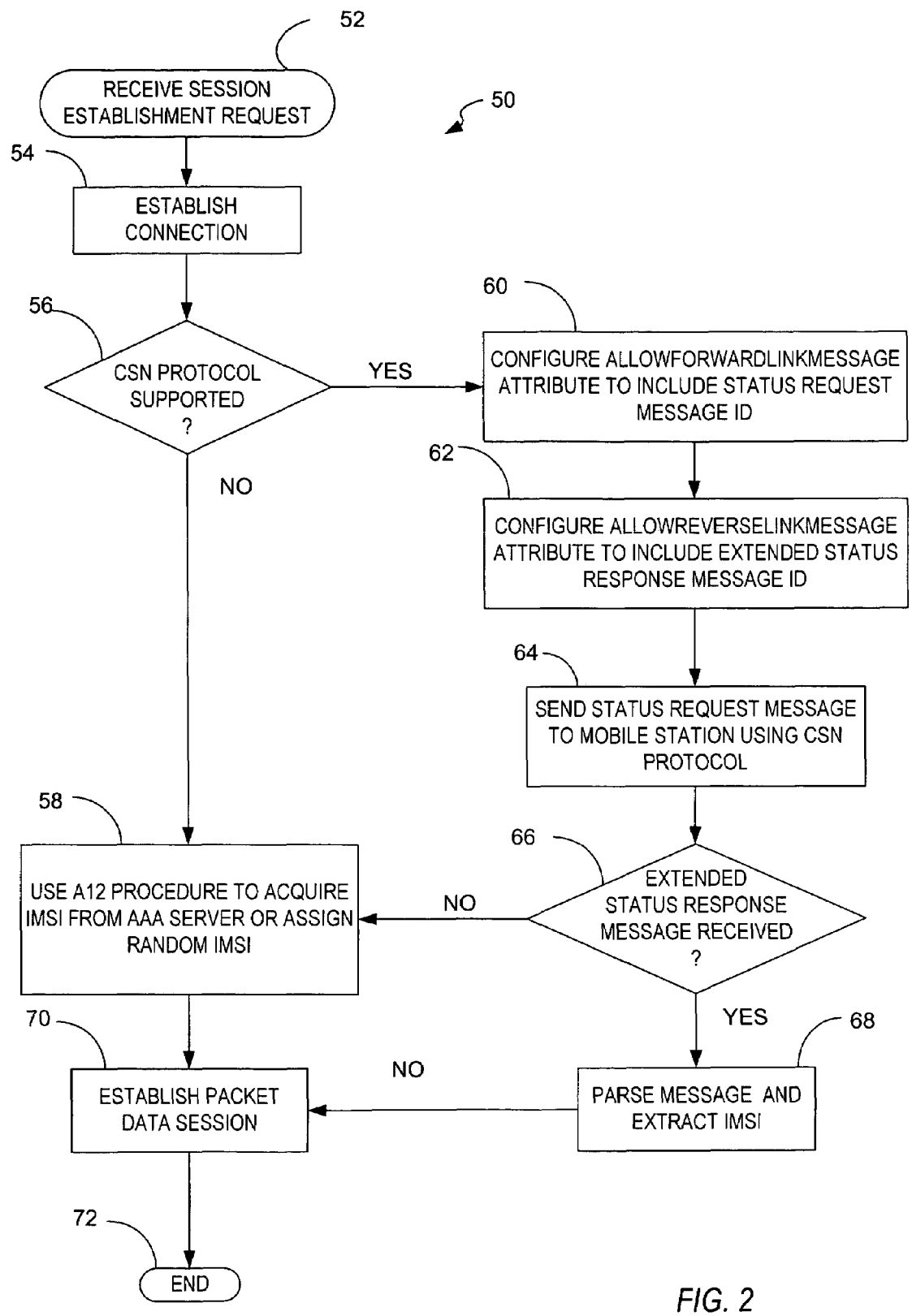
FIG. 2 is a flow chart illustrating an exemplary procedure for acquiring a mobile station identifier.

FIG. 2 illustrates an exemplary procedure 50 implemented by the HRPD AN 36. The procedure is based on the CSN protocol described in *cdma2000 High Rate Packet Data Air Interface Specification*, C.S0024, Version 1.0 (March 2004) which is incorporated herein by reference. The procedure begins when the HRPD AN 36 receives a session establishment request (block 52). The HRPD AN 36 establishes a connection with the mobile station 100 and negotiates supported protocols (block 54). The HRPD AN 36 then determines whether the circuit services notification protocol is supported (block 56). If not, the HRPD AN 36 uses existing A12 procedures to acquire the IMSI from the AAA server 38 (block 58) and establish a packet data session (block 70). If the A12 interface is not supported, the HRPD AN 36 may assign a random IMSI. If the CSN protocol is supported, the HRPD AN 36 configures the AllowForwardLinkMessage attribute to include the status request message ID (block 60), and configures the AllowReverseLinkMessage attribute to include the extended status response message ID (block 62). The HRPD AN 36 then sends a 3G 1x status request message to the mobile station 100 using the CSN protocol (block 64) and waits for a reply (block 66). If no reply is received after a predetermined time period, the HRPD AN 36 can use existing A12 procedures to acquire the IMSI from an AAA server 38 or assign a random IMSI (block 58) and establish the packet data session (block 70). If the HRPD AN 36 receives the 3G 1x extended status response message (block 66), it de-capsulates and parses the extended status response message to obtain the IMSI (block 68) and uses the IMSI to establish the packet data session (block 70). The procedure ends (block 72) once the packet data session is established.

Figure 3:
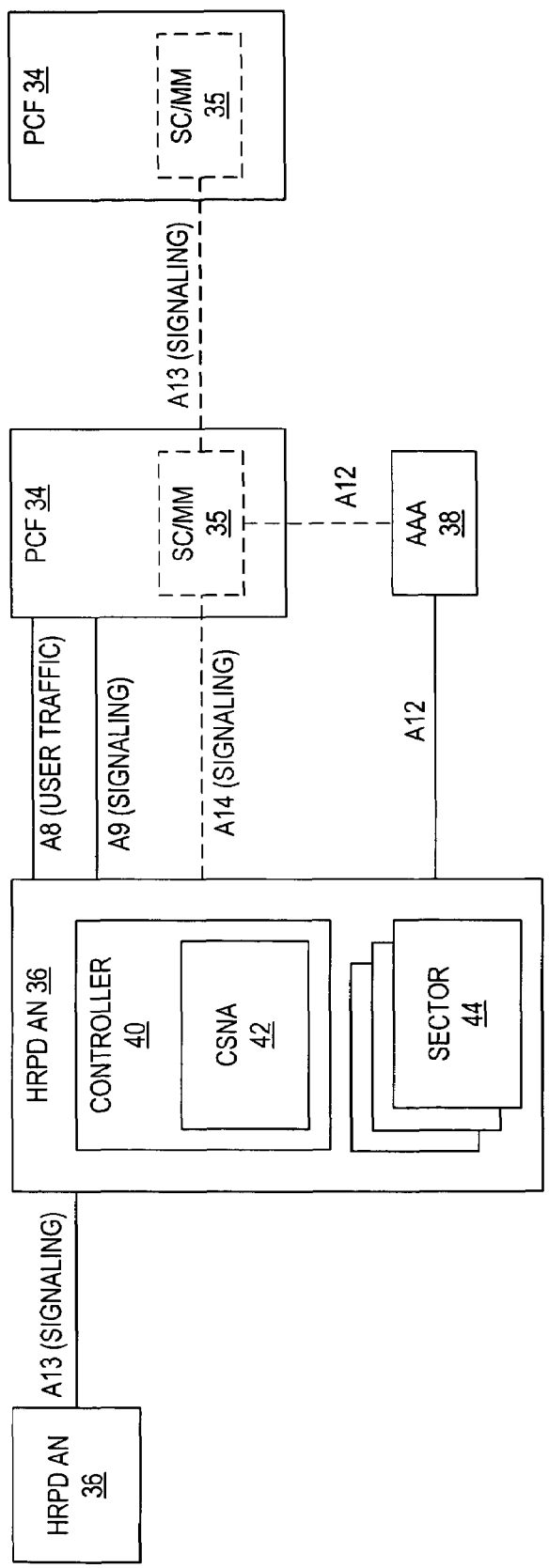
FIG. 3 is a block diagram of an exemplary access network using the procedure shown in FIG. 2.

FIG. 3 illustrates an exemplary HRPD AN 36 in more detail. The entities depicted in dotted lines indicate features present in the TIA-1878 interoperability standard, but not present in the TIA-878 interoperability standard. The HRPD AN 36 includes a controller 40 and one or more sectors 44. The sectors 44 contain the radio equipment for communicating with the mobile stations 100. The controller 40 processes call control signaling and manages the radio and communication resources used by the sectors 44. The controller 40 includes a CSNA 42 to implement the CSN protocol as previously described. In other embodiments, the CSNA functionality may be distributed between the HRPD AN 36 and PCF 34 or SC.MM 35. The CSNA 42 encapsulates 3G 1x messages in HRPD messages for transmission to the mobile station 100 over the air interface and receives encapsulated 3G 1x messages over the HRPD air interface from mobile stations 100. The CSNA 42 generates and sends a status request message to the mobile station 100 to request the mobile station IMSI. The CSNA 42 also processes the extended status response message form the mobile station 100 as previously described to obtain the mobile station IMSI. Signaling traffic between the BSC 40 and the MSC 22 is carried over the A1 interface if present. User traffic between the MSC 22 and cdma2000 1× base stations 24 is carried by the A2 and A5 interfaces. The A8 and A9 interfaces carry user traffic and signaling, respectively, between the HRPD AN 36 and PCF 26. The A13 interface carries signaling traffic between HRPD ANs 36 in an HRPD network based on the IS-878 interoperability standard, or between SC/MMs 35 in an HRPD network based on the IS-1878 interoperability standard. The A14 interface carries signaling between the HRPD AN 36 and SC/MM 35 in an HRPD network 14 based on the TIA-1878 interoperability standard. The A14 interface is not present in an HRPD network 14 based on the TIA-878 interoperability standard. The A12 carries signaling information between the HRPD AN 36 or SC/MM 35 and the AAA server 38 depending on the interoperability standard used.

While the present invention has been described in the context of a handoff between an HRPD AN 14 and a cdma2000 1× network 12, the invention may also be useful in other contexts as well. For example, the present invention is useful to enable seamless handoff between two HRPD ANs 36 when the A13 interface is not supported by one of the HRPD ANs 36. Also, those skilled in the art will recognize that the present invention may be useful in other hybrid networks, and is not limited to use in a hybrid networks based on cdma2000 1× and HRPD standards.

What is claimed is:

1. A method of obtaining a non-native mobile station identifier used by a mobile station for signaling over an air interface in a non-native network, the method comprising:

inducing the mobile station to transmit a non-native message containing a mobile station identifier encapsulated in an native message;

de-capsulating and parsing the non-native message to obtain the mobile station identifier.

2. The method of claim 1 wherein inducing the mobile station to transmit a non-native message containing a mobile station identifier encapsulated in an native message comprises sending a non-native message to said mobile station encapsulated in a native message to induce the mobile station to transmit a responsive non-native message containing the mobile station identifier.

3. The method of claim 2 wherein the non-native message transmitted to the mobile station is a status request message.

4. The method of claim 3 wherein the non-native transmitted by the mobile station comprises an extended status response message.

5. The method of claim 1 wherein the non-native message is a cdma2000 1× signaling message.

6. The method of claim 5 wherein the native message is an HRPD message.

7. The method of claim 1 wherein the non-native mobile station identifier comprises an International Mobile Station Identifier.

8. An access network including a controller configured to:
induce a mobile station to transmit a non-native message to the base station containing a non-native mobile station identifier encapsulated in an native message;
de-capsulate the non-native message; and
parse the non-native message to obtain a non-native mobile station identifier.

9. The access network of claim 8 wherein the controller induces the mobile station to send a non-native message containing the non-native mobile station identifier by sending the mobile station a second non-native message encapsulated in a second native message.

10. The access network of claim 9 wherein the non-native message transmitted to the mobile station is a status request message.

11. The access network of claim 10 wherein the non-native transmitted by the mobile station comprises an extended status response message.

12. The access network of claim 9 wherein the non-native message is a cdma2000 1×signaling message.

13. The access network of claim 12 wherein the native message is an HRPD message.

14. The access network of claim 8 wherein the non-native mobile station identifier is an International Mobile Station Identifier.

* * * * *